(12) United States Patent
Seo (10) Patent No.: US 12,280,462 B2
(45) Date of Patent: Apr. 22, 2025

(54) MICROCHIP TREATMENT DEVICE FOR MACHINE TOOL

(71) Applicant: DN SOLUTIONS CO., LTD., Changwon-si (KR)

(72) Inventor: Eun Soo Seo, Changwon-si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 492 days.

(21) Appl. No.: 17/909,980

(22) PCT Filed: Mar. 16, 2021

(86) PCT No.: PCT/KR2021/003231
§ 371 (c)(1),
(2) Date: Sep. 7, 2022

(87) PCT Pub. No.: WO2021/210793
PCT Pub. Date: Oct. 21, 2021

(65) Prior Publication Data
US 2023/0102942 A1    Mar. 30, 2023

(30) Foreign Application Priority Data
Apr. 16, 2020 (KR) .................... 10-2020-0045957

(51) Int. Cl.
*B23Q 11/10* (2006.01)
*B01D 21/26* (2006.01)
(Continued)

(52) U.S. Cl.
CPC .......... *B23Q 11/1069* (2013.01); *B01D 21/26* (2013.01); *B01D 36/045* (2013.01);
(Continued)

(58) Field of Classification Search
CPC ................. B23Q 11/1069; B23Q 11/0067
See application file for complete search history.

(56) References Cited

U.S. PATENT DOCUMENTS

2008/0267723 A1\* 10/2008 Tezuka .................. B23Q 11/08
                                                                409/137
2014/0377028 A1\* 12/2014 Inaguchi ................ B23Q 11/08
                                                                409/134

FOREIGN PATENT DOCUMENTS

JP      57-170941 U    * 10/1982
JP      2002036058 A      2/2002
(Continued)

OTHER PUBLICATIONS

EP Application 21787973 search opinion dated Feb. 27, 2024.\*
(Continued)

*Primary Examiner* — Erica E Cadugan
(74) *Attorney, Agent, or Firm* — STIP Law Group, LLC (57) ABSTRACT

A flushing duct is installed on both sides of a table of the machine tool in a longitudinal direction of the table, a slope duct is inclinedly disposed below the flushing duct toward the coolant tank, each bottom surface of the flushing duct and the slope duct is formed with a V-shaped inclined surface and a streamlined bending portion to make flows of the coolant containing the microchips smooth, and a coolant supply valve is installed at a rear end of the flushing duct to facilitate flows of the coolant being discharged by supplying additional coolant. Further, a coolant tank is installed below the slope duct, a filter is installed in the coolant tank for filtering the microchips in the coolant. The coolant containing the microchips is transported through a return pump to a centrifugal separator device where the microchips contained in the coolant are centrifugally separated. A refined coolant through centrifugal separation is supplied to the machine tool, thereby preventing abnormal wear due to penetration of the microchips into rotating and sliding portions of the machine tool.

3 Claims, 8 Drawing Sheets

(51) Int. Cl.
    *B01D 36/00*     (2006.01)
    *B01D 36/04*     (2006.01)
    *B23Q 11/00*     (2006.01)
    *B23Q 11/14*     (2006.01)

(52) U.S. Cl.
    CPC ...... *B23Q 11/0053* (2013.01); *B23Q 11/0067* (2013.01); *B23Q 11/146* (2013.01); *B23Q 11/10* (2013.01); *Y10T 409/304032* (2015.01)

(56) References Cited

FOREIGN PATENT DOCUMENTS

| | | | |
|---|---|---|---|
| JP | 2006007391 | A | 1/2006 |
| JP | 3133412 | U | 7/2007 |
| JP | 2008207314 | A | 9/2008 |
| JP | 2016059986 | A | 4/2016 |
| KR | 100688956 | B1 | 3/2007 |
| KR | 101585597 | B1 | 1/2016 |
| SU | 1269971 | A1 * | 11/1986 |

OTHER PUBLICATIONS

Machine translation of JP 2002-036058 A, which JP '058 was published Feb. 5, 2002.*
Machine translation of JP 2006-007391 A, which JP '391 was published Jan. 1, 2006.*
Machine translation of JP 3133412 U, which JP '412 was published Jul. 12, 2007.*
International Search Report of PCT/KR2021/003231, Jun. 23, 2021, English translation.

* cited by examiner

MICROCHIP TREATMENT DEVICE FOR MACHINE TOOL

CROSS-REFERENCE TO RELATED APPLICATIONS

This application is the U.S. National Phase under 35 U.S.C. § 371 of International Application No. PCT/KR2021/003231 filed on Mar. 16, 2021, which in turn claims the benefit of Korean Application No. 10-2020-0045957 filed on Apr. 16, 2020, the disclosures of which are incorporated by reference into the present application.

TECHNICAL FIELD

The present invention relates to a chip processing device for a machine tool, and more specifically, to a chip processing device to process microchips having high hardness.

BACKGROUND ART

In general, materials with high hardness such as glass or quartz are machined with a low load in a machine tool like a machining center, in which fine or microchips in a powder shape are generated during machining.

Such powder-shaped microchips are so small in a grain size that they would not be sufficiently filtered by a conventional chip processing device and would be recirculated with a coolant, i.e., a cutting fluid to be reused in the machine tool.

The microchips mixed with the coolant may scatter within the machine tool and can penetrate an internal feed system or a spindle through a cover or a gap formed in the machine tool. Since such microchips have very small particle size and high hardness, they may accelerate wear of rotating and sliding parts, which may reduce a precision of the machine tool and further shorten a lifespan of the machine tool.

As a related art, there has been Japanese Patent Laid-Open Publication No. 2008-207314 (Patent Document 1). Patent Document 1 discloses a chip processing device for a door-type machine tool where a channel-shaped discharging path for powder-shaped microchips is inclinedly disposed at both sides of a table of the machine tool and a pump installed at one side of the discharging path supplies a coolant to the discharging path to transport the microchips to be collected at a chip storage. Further, the chip processing device of Patent Document 1 is provided with a chip receiving basin which has a filter to separate the chips from the coolant at one side of the chip storage, and the coolant collected at the chip receiving basin is transported again to a coolant storage tank and is then reused in the machine tool.

According to the chip processing device of Patent Document 1, in case of microchips with high hardness such as glass or quartz, such microchips would be deposited or adsorbed in the chip discharging path even though the chip discharging path is inclinedly installed or the coolant is additionally supplied thereto using the pump, and hence it would be difficult for the discharging path in a simple channel-shaped structure to discharge the microchips with high hardness such as glass or quartz. Moreover, such microchips with high hardness such as glass or quartz would not be sufficiently filtered by a simple conventional filter, such that they penetrate into the rotating or sliding parts of the machine tool when reused with the coolant and cause abrasion or wear troubles.

In addition, another prior art Patent Document 2 (Korean Patent No. 10-1158559) discloses a chip conveyor device for a high pressure coolant supplying apparatus where the coolant of a chip storage in which chips separated by a chip separator are stored is additionally, filtered and is supplied to the machine tool by a high pressure pump.

However, the chip processing device of Patent Document 2 would not sufficiently filter the coolant including the microchips with high hardness such as glass or quartz even with two times filtration process since the chips are too fine to be filtered or removed. Therefore, when the coolant which has not been sufficiently filtered are reused, the chips would penetrate into the rotating or sliding parts to raise wear problems.

DISCLOSURE OF INVENTION

Technical Problem

To resolve the problems discussed above, an object of the present invention is to provide a chip processing device for a machine tool that improves a flow of a coolant to collect microchips, separates the collected microchips from the coolant and reuses a refined coolant the machine tool, which prevents the microchips with high hardness from penetrating into the machine tool to accelerate wear of the machine tool.

Technical Solution

To achieve the objects discussed above, a chip processing device for a machine tool may comprise: a flushing duct installed on both sides of a table of the machine tool in a longitudinal direction of the table, in which one end portion of the flushing ducts inclinedly disposed and a lower cross-section thereof forms a V-shaped inclined surface, and a corner portion where both inclined surfaces meet forms a streamlined bending portion; a slope duct inclinedly disposed to allow a coolant supplied from the flushing duct to flow in a downward direction of one end portion of the table of the machine tool, in which a lower cross-section of the slope duct forms a V-shaped inclined surface, and a corner portion where both inclined surfaces meet forms a streamlined bending portion; a coolant supply valve installed at an upper end of the inclined flushing duct to supply the coolant to the flushing duct; a coolant tank provided below the one end portion of the slope duct to collect the coolant fallen from both the flushing duct and the slope duct; and a centrifugal separator device installed at one side of the coolant tank to separate the microchips included in the coolant.

A primary filter may be disposed at an inlet of the coolant tank for filtering large-sized chips among the microchips contained in the coolant supplied from the flushing duct and the slope duct, and a sliding plate may be inclinedly installed below the primary filter toward a center portion of the coolant tank, and a primary return pump may be provided at the center portion of the coolant tank whose suction port is disposed toward a bottom surface of the coolant tank to introduce and pump the coolant containing the microchips to a dirty tank of the centrifugal separator device.

A secondary filter may be provided between the coolant tank and the dirty tank to transport the coolant, which has not been transported through the primary return pump, to the dirty tank.

The coolant tank may comprise a level sensor for detecting a level of the coolant in the coolant tank and a primary return pump for transporting the coolant containing the microchips to a dirty tank of the centrifugal separator device when the coolant level detected by the level sensor is within a predetermined range, and wherein when the coolant level detected by the level sensor reaches a predetermined maximum level, the level sensor may be configured to make an emergency stop of the machine tool.

The centrifugal separator device may comprise a dirty tank for receiving and storing the coolant containing microchips from the primary return pump installed at the center portion of the coolant tank, a secondary return pump installed at an upper portion of the dirty tank to pump the coolant in the dirty tank, a main separator body for centrifugally separate the coolant supplied through the secondary return pump into microchips and the coolant, a coolant cooler for cooling a refined coolant in which the microchips are separated and removed through the main separator body, and a clean tank receiving the coolant which has been cooled from the coolant cooler.

Advantageous Effects

The chip processing device of an exemplary embodiment of the present invention may collect the microchips without leaving any residues in the coolant tank when machining a workpiece which has high hardness such as glass or quartz and generates microchips during a cutting operation, and completely separates and discharges the microchips contained in the collected coolant, reusing only refined coolant without microchips in the machine tool, which may allow prevention of abrasion inside the machine tool due to penetration of the microchips

DESCRIPTION OF DRAWINGS

In order that the disclosure may be well understood, there will now be described various forms thereof, given by way of example, reference being made to the accompanying drawings, in which.

MODE FOR INVENTION

The following description is merely exemplary in nature and is not intended to limit the present disclosure, application, or uses. It should be understood that throughout the drawings, corresponding reference numerals indicate like or corresponding parts and features.

Exemplary preferred embodiments of the present invention are briefly described in detail with reference to the accompanying drawings, FIGS. 1 to 3.

Figure 1:
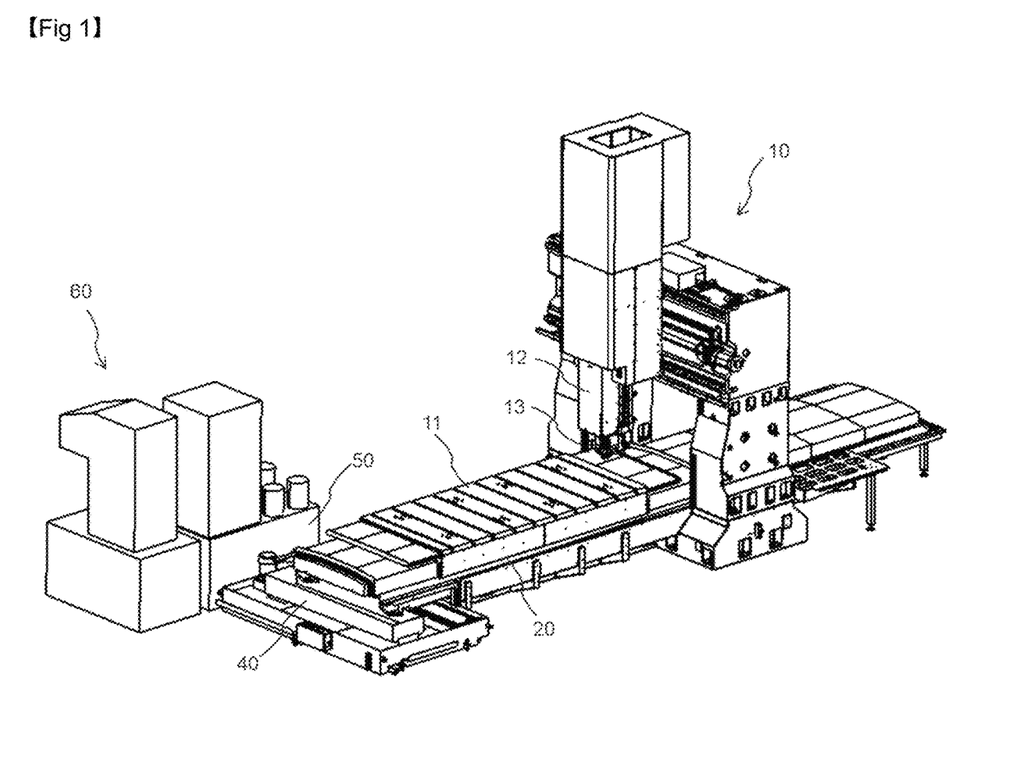
FIG. 1 is a perspective view of a machine tool provided with a chip processing device according to an exemplary embodiment of the present.
Figure 2:
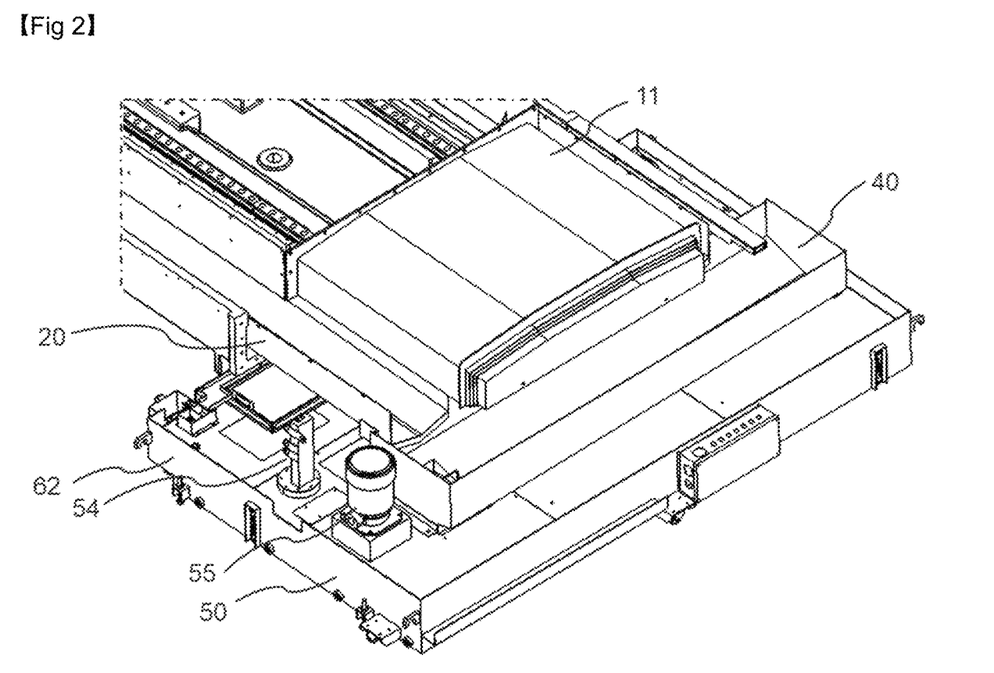
FIG. 2 is a partial perspective view in detail showing one end portion of a table of the machine tool according to an exemplary embodiment of the present invention.
Figure 3:
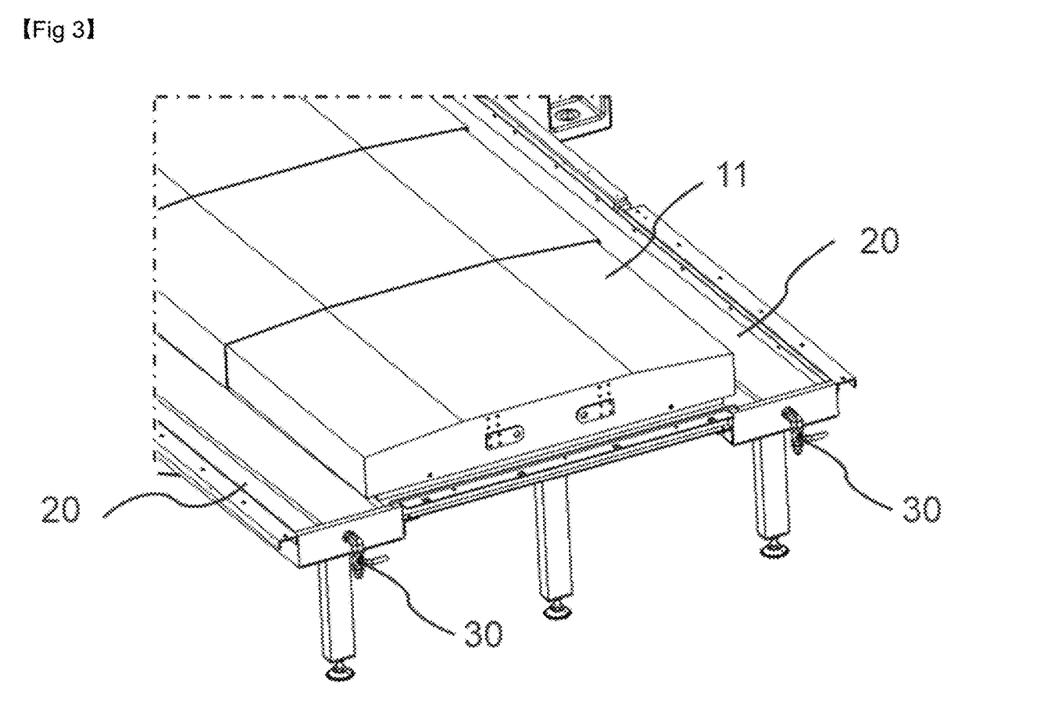
FIG. 3 is a partial perspective view in detail showing the other end portion of the table of the machine tool according to an exemplary embodiment of the present invention.

FIG. 1 is a perspective view of a machine tool 10 provided with a chip processing device according to an exemplary embodiment of the present invention, and FIGS. 2 and 3 are partial perspective views showing both end portions of a table of the machine tool 10 according to an exemplary embodiment of the present invention, respectively.

A flushing duct 20 may be installed at both sides of a table 11 of the machine tool 10 in a longitudinal direction of the table 11 in which one end portion of the flushing duct 20 may be inclinedly positioned. The flushing duct 20 is configured to discharge a coolant sprayed from a coolant spray nozzle 13 of a die 12 and chips of the workpiece being machined on the table 11. Since the flushing duct 20 is inclinedly disposed in one direction, a flow of a coolant containing microchips may be formed accordingly.

A slope duct 40 may be disposed at one end portion of the table 11 of the machine tool 10 to receive the coolant falling from the flushing ducts 20 installed at both sides of the table 11, where the slope duct 40 is inclinedly installed toward the coolant tank 50. Therefore, the coolant containing the microchips discharged from the flushing duct 20 falls into the slope duct 40 and then flows into the coolant tank 50.

At a lower portion of the one end portion of the slope duct 40 on which the coolant falls from the slope duct 40 a coolant tank 50 may be provided to collect the coolant and microchips discharged from the slope duct 40.

A centrifugal separator device 60 may be installed at one side of the coolant tank 50 to separate the microchips included in the coolant.

As disclosed in FIG. 3, a coolant supply valve 30 may be installed at an opposite end portion of the flushing duct 20, where: the coolant from the flushing duct 20 is discharged, to supply the coolant to the flushing duct 20. The coolant supply valve 30 may be configured to receive the coolant from a coolant supply pump 71 and to supply the coolant to the flushing duct 20. Accordingly, in addition to the coolant being sprayed onto the table 11 from the coolant spray nozzle 13, an amount of the coolant to be flown the flushing duct 20 is increased, which enables the coolant containing the microchips to smoothly flow in a discharge direction thereof.

Hereinafter, main components of the chip processing device of the present invention as illustrated above will be described in more detail.

Figure 4:
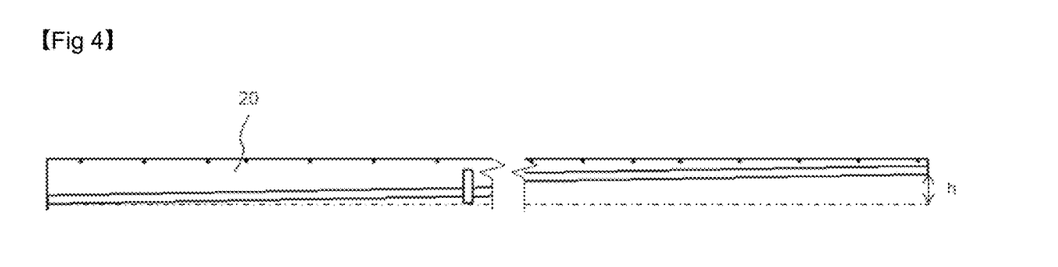
FIG. 4 is a side view showing a flushing duct installed at both sides of the table of the machine tool according to an exemplary embodiment of the present invention.
Figure 5:
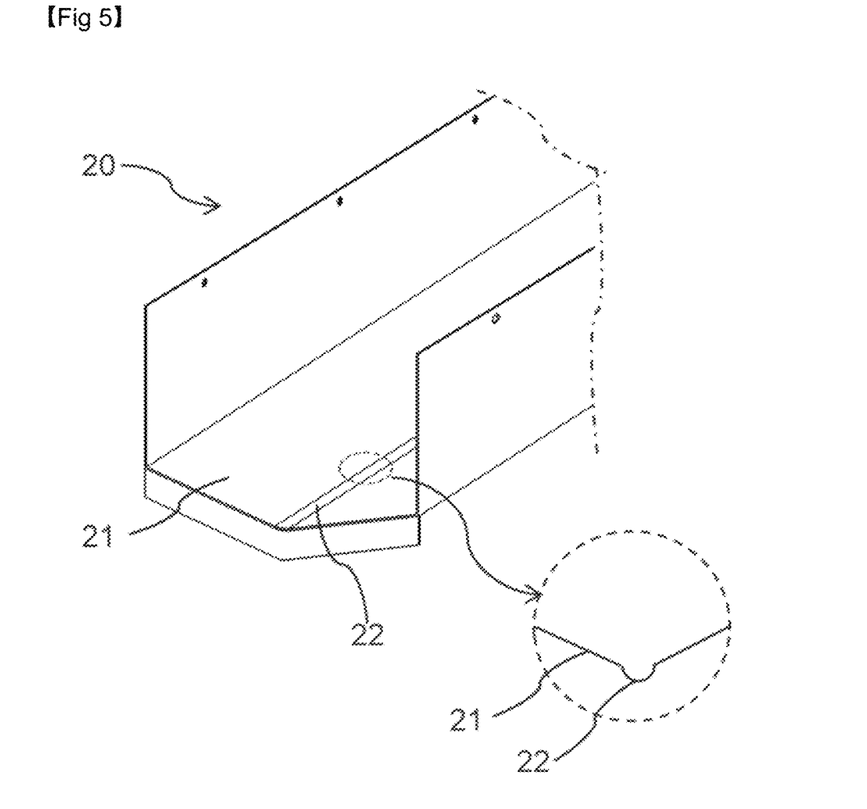
FIG. 5 is a partial perspective view of one end portion of the flushing duct according to an exemplary embodiment of the present invention.

Firstly, a flushing duct 20 will be described. FIGS. 4 and 5 illustrate a side view of the flushing duct and a perspective view of one end portion of the flushing duct according to an exemplary embodiment of the present invention, respectively. The flushing duct 20 may be installed at both sides of a table 11 of a machine tool 10 in a longitudinal direction of the table 11. Here, the flushing duct 20 may be inclinedly positioned where one end portion of the flushing duct 20 is disposed at a predetermined height (h) higher than the other end thereof to enable the coolant containing the microchips fallen from the table 11 to be smoothly flowing on the flushing duct 20.

The flushing duct 20 may have a lower cross-section formed in a V-shaped inclined surface 21 to facilitate flowing operation of the coolant containing the microchips and to make the flow fast even with a small amount of the coolant. Further, the flushing duct 20 may be formed with a (curved) streamlined bending portion 22 at a corner portion where both inclined surfaces 21 meet together.

Accordingly, the coolant containing the microchips fallen from the table 11 may flow along the inclined surface 21 and the bending portion 22, and then the coolant including the microchips may not be accumulated inside of the flushing duct 20 with the help of the coolant additionally supplied from a coolant supply valve 30 and may be smoothly discharged from the flushing duct 20.

Figure 6:
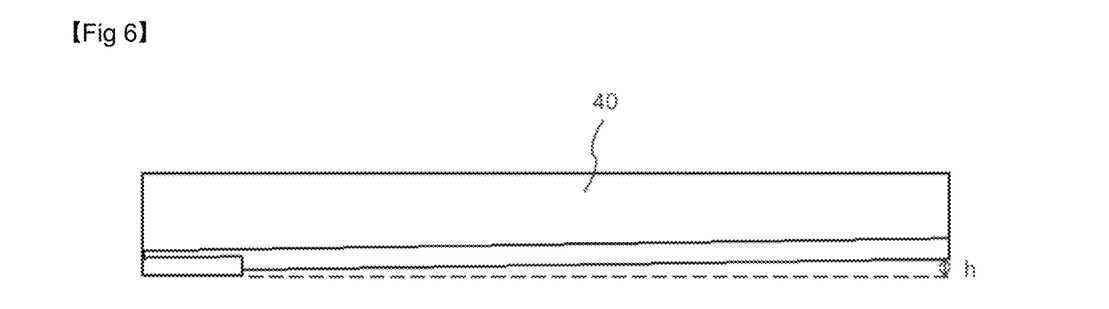
FIG. 6 is a side view showing a slope duct installed at one side of the table of the machine tool according to an exemplary embodiment of the present invention.
Figure 7:
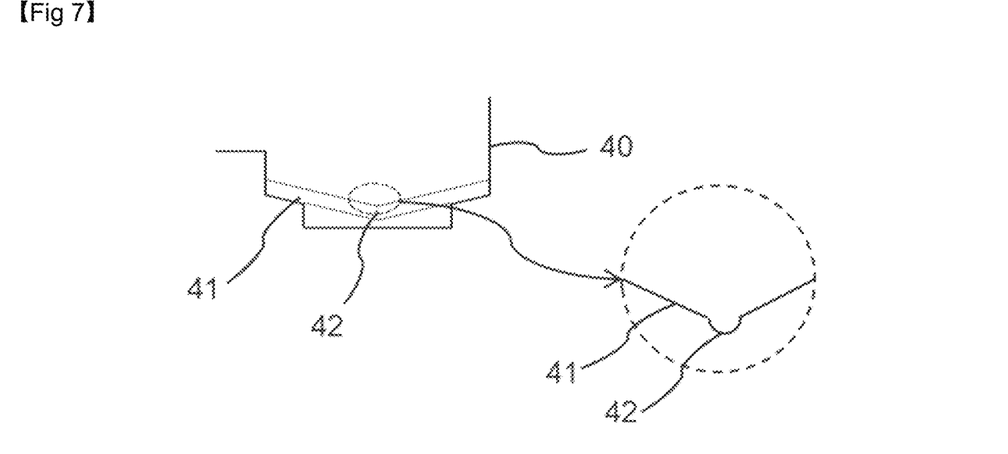
FIG. 7 is a front view illustrating the slope duct according to an exemplary embodiment of the present invention.

Next, a slope duct 40 will be described. FIGS. 6 and 7 illustrate a side view and a front view of the slope duct according to an exemplary embodiment of the present invention, respectively.

The slope duct 40 may serve to receive the coolant fallen from the flushing duct 20, which is installed at both sides of the table 11, and to discharge the coolant to a coolant tank 50. The slope duct 40 may be inclinedly positioned where one end portion of the slope duct 40 toward the coolant tank 50 is disposed at a predetermined height (h) lower than the other end thereof to enable the coolant containing the microchips to be smoothly flowing on the slope duct 40.

The slope duct 40, like the flushing duct 20, may have a lower cross-section formed in a V-shaped inclined surface 41 to facilitate flowing operation of the coolant containing the microchips being discharged from the flushing duct 20 and to provide a fast moving speed of the coolant. In addition, the slope duct 40 may be formed with a (curved) streamlined bending portion 42 at a corner portion where both inclined surfaces 41 meet together. As such, the coolant including the microchips, which has been flown from the flushing duct 20, may not be accumulated inside of the slope duct 40 and may be then smoothly discharged to a coolant tank 50.

Figure 8:
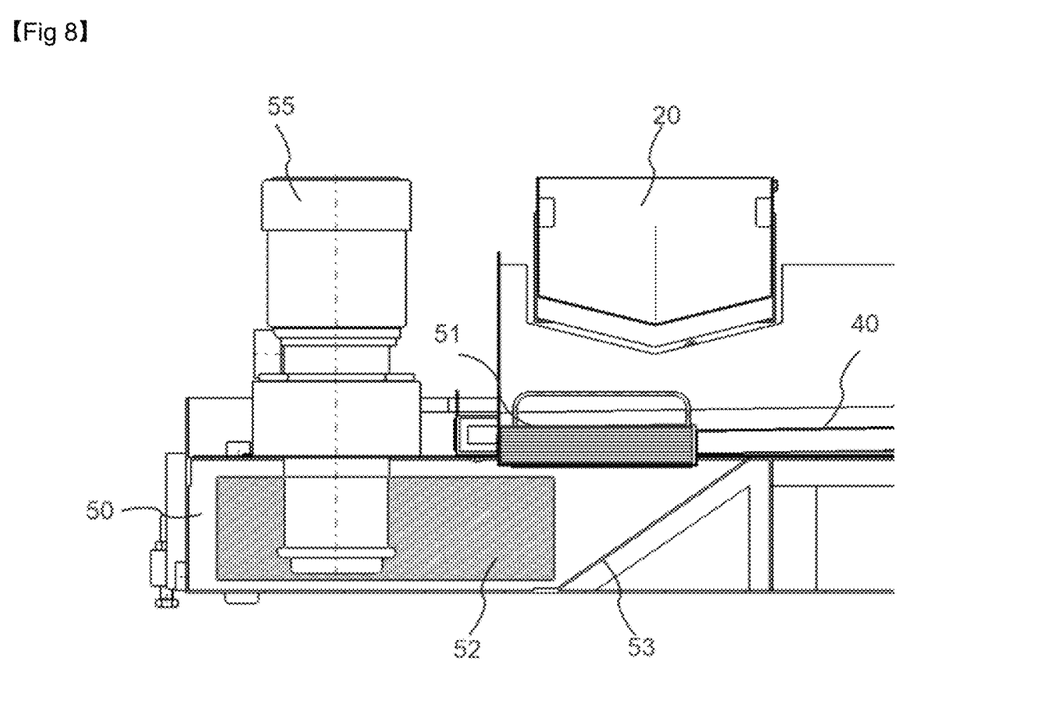
FIG. 8 is a partial sectional view illustrating a portion provided with a coolant tank according to an exemplary embodiment of the present invention.
Figure 9:
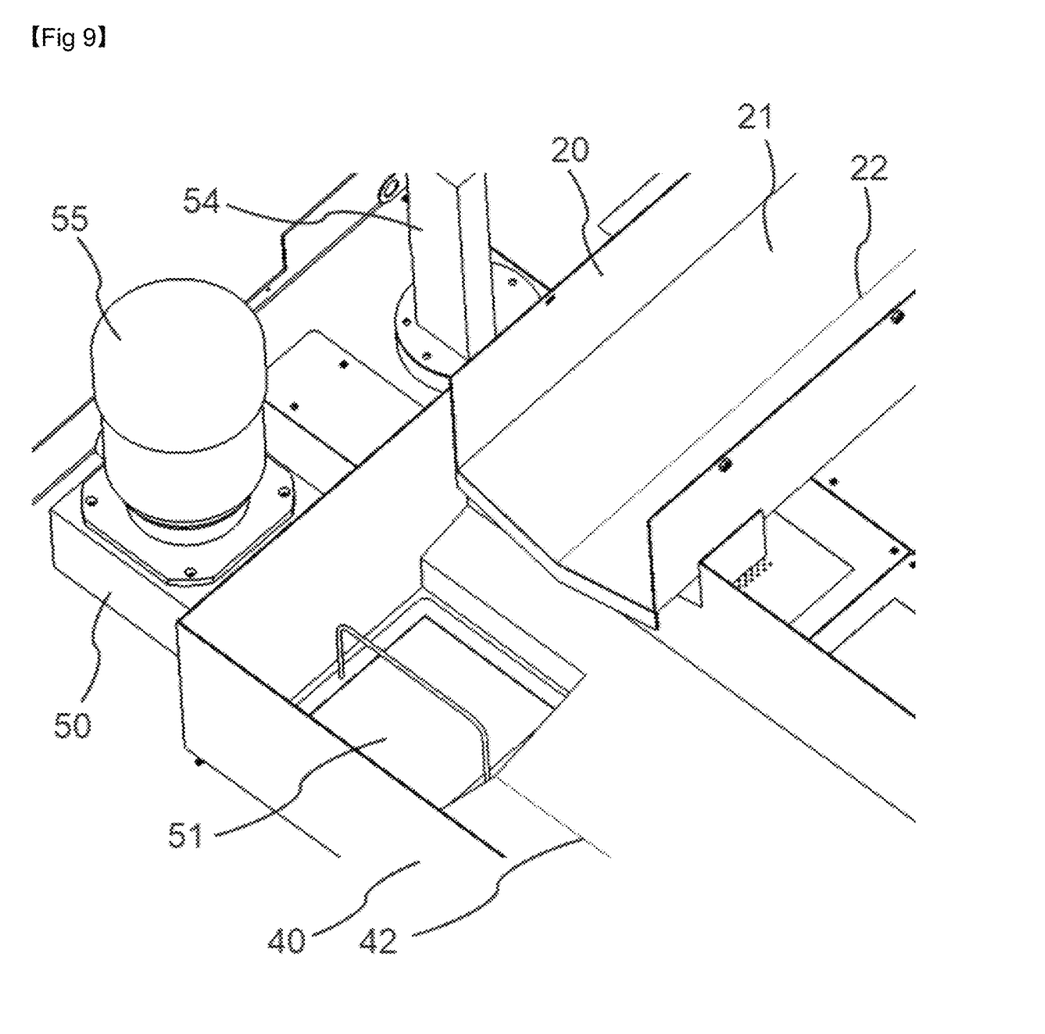
FIG. 9 is a partial perspective view illustrating a portion provided with a coolant tank according to an exemplary embodiment of the present invention.

The coolant tank 50 will be described, hereinbelow. FIGS. 8 and 9 illustrate a sectional view and a perspective view of a portion provided with a coolant tank according to an exemplary embodiment of the present invention, respectively.

The coolant tank 50 may be provided at a position where the coolant falls from the slope duct 40 below one end portion of the slope duct 40 and may collect and store the coolant containing the microchips discharged from the slope duct 40.

At an inlet of the coolant tank 50, a primary filter 51 may be disposed for filtering relatively large-sized, chips among the microchips contained in the coolant which have been fallen from the flushing duct 20 and the slope duct 40. A sliding plate 53 may be inclinedly, installed below the primary filter 51 toward a center portion of the coolant tank 50. Here, the sliding plate 53 may serve to guide the microchips contained in the coolant, which have been passed through the primary filter 51 and fallen therefrom, to be moved thereon and accumulated at the center portion of the coolant tank 50.

A primary return pump 55 may be provided at the center portion of the coolant tank 50. The primary return pump 55 whose inlet is disposed toward a bottom surface of the coolant tank 50 is configured to introduce and then pump the coolant containing the microchips to a dirty tank 62 of the centrifugal separator device 60.

As such, relatively large-sized chips may be filtered through the primary filter 51, and the remaining microchips may be guided to the sliding plate 53 and then all gathered at the center portion of the coolant tank 50. However, the microchips which would not have been gathered at the center portion of the coolant tank 50, are to be congregated at the center portion of the coolant tank 50 by vortex flows of the coolant formed by the sliding plate 53 and thereafter transported through the primary return pump 55 to the dirty tank 62 of the centrifugal separator device 60.

A secondary filter 52 may be provided between the coolant tank 50 and the dirty tank 62, of the centrifugal separator device 60 which is installed at one side of the coolant tank 50. A portion of the coolant which has not been transported through the primary return pump 55 may be filtered and then transported to the dirty tank 62.

The coolant tank 50 may include a level sensor 54. The level sensor 54 may measure a level of the coolant stored in the coolant tank 50. When the coolant level reaches a predetermined range, e.g., an intermediate level, the primary return pump 55 is operated. In contrast, when the coolant level is lower than the predetermined range the primary return pump 55 is stopped and the coolant containing the microchips in the coolant tank 50 is then transported to the dirty tank 62 of the centrifugal separator device 60.

Meanwhile, when the level sensor 54 detects a predetermined maximum coolant level, it means the level of the coolant in the coolant tank 50 is too high. Accordingly, it is determined that the primary return pump 55 or the level sensor 54 is failed, so the machine tool 10 is controlled to an emergency stop.

Figure 10:
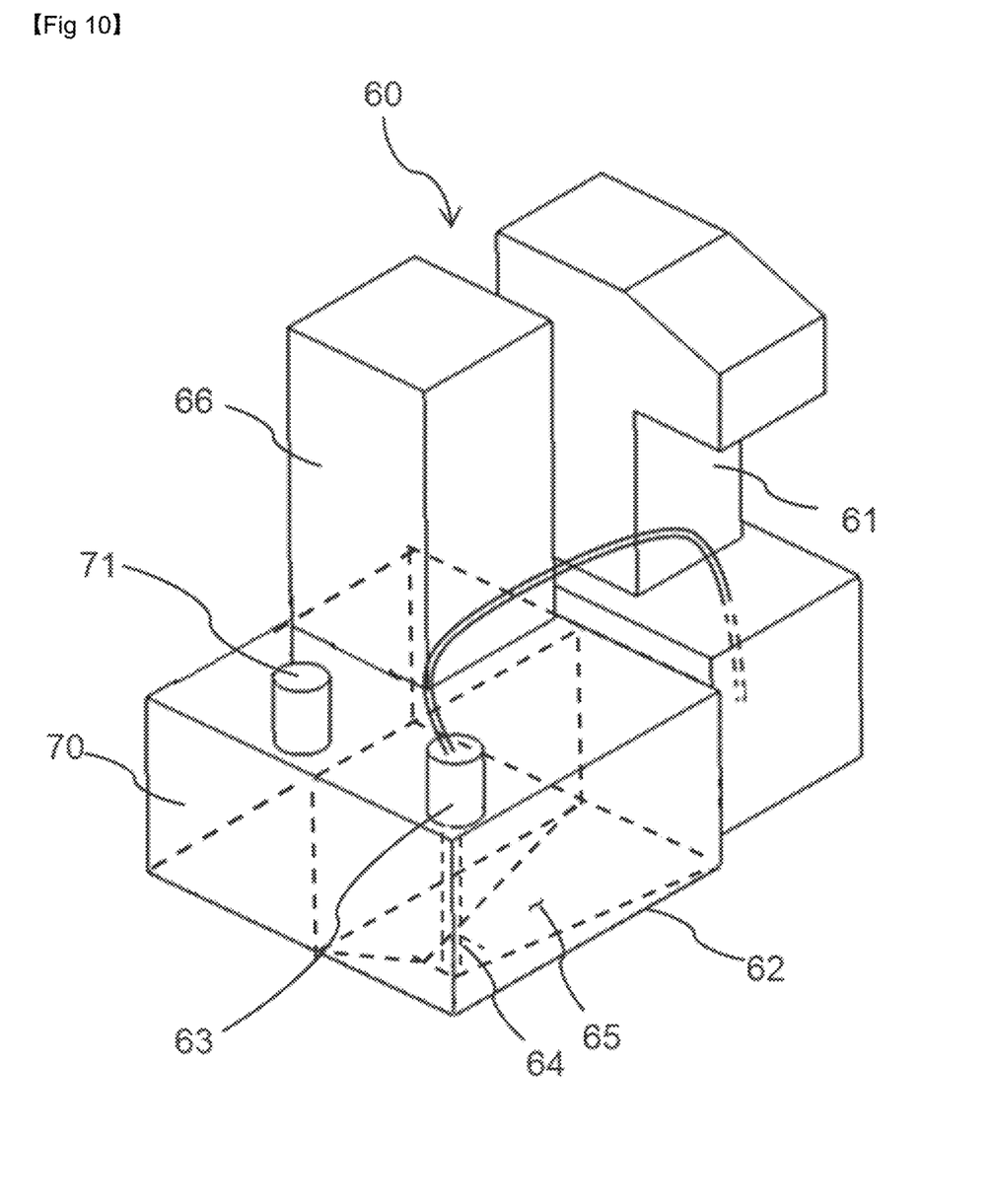
FIG. 10 is a schematic perspective view illustrating a centrifugal separator device according to an exemplary embodiment of the present invention.

The centrifugal separator device 60 will be described. FIG. 10 illustrate a schematic perspective view of the centrifugal separator device 60 according to an exemplary embodiment of the present invention.

The centrifugal separator device 60 may be installed at one side of the coolant tank 50. The centrifugal separator device 60 is configured to separate the microchips contained in the coolant using a centrifugal force which has been transported from the coolant tank 50 via the primary return pump 55 and then to discharge the coolant in which the microchips are removed to be reused in the machine tool 10.

The dirty tank 62 may be provided at a lower portion of the centrifugal separator device 60 for receiving and storing the coolant containing the microchips from the primary return pump 55 installed in the coolant tank 50. A secondary return pump 63 may be installed at an upper portion of the dirty tank 62 to supply the coolant containing the microchips in the dirty tank 62 to a main separator body 61 installed above the dirty tank 62. Here, a bottom surface of the dirty tank 62 may have a gradient 65 toward a suction port 64 of the secondary return pump 63, such that the microchips would be gathered toward the suction port 64 due to the gradient 65 and be transported to the main separator body 61 without leaving any residues.

The main separator body 61 may be configured to separate the microchips and the coolant using the centrifugal force and to discharge the separated microchips to the outside. A refined coolant in which the microchips have been removed may be cooled to a predetermined temperature through a coolant cooler 66 provided adjacent to the main separator body 61 and then transported to a clean tank 70 provided at one side of the main separator body 61.

Figure 11:
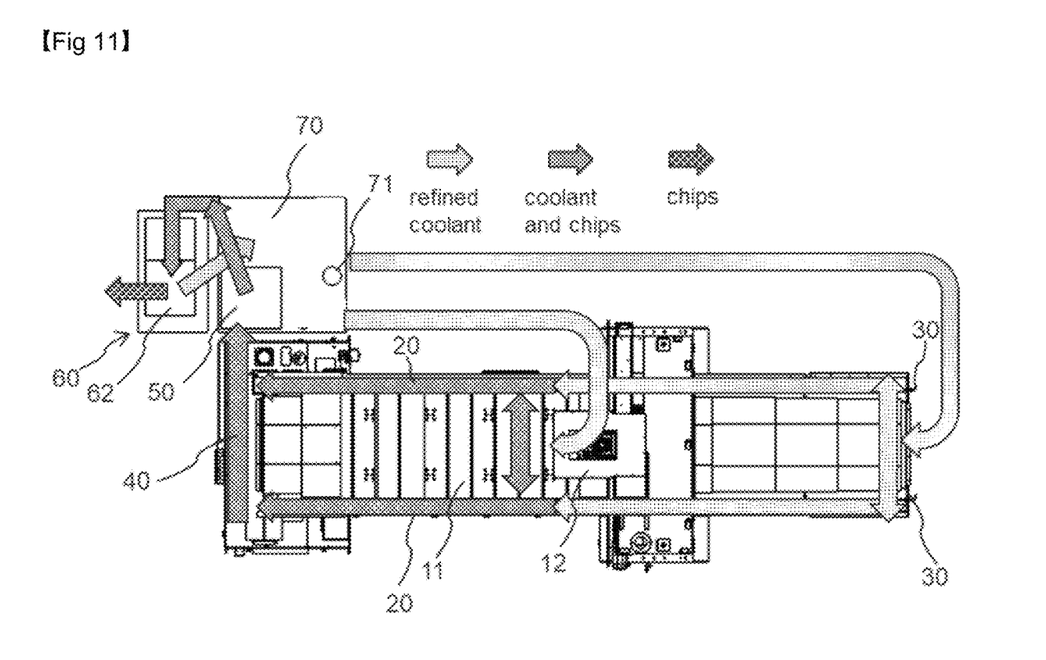
FIG. 11 is a conceptual diagram in a plan view illustrating a coolant flow state in the machine tool according to an exemplary embodiment of the present invention.

FIG. 11 is a conceptual diagram in a plan view illustrating a coolant flow state in the machine tool 10 according to an exemplary embodiment of the present invention. As shown in FIG. 11, a refined coolant, in which the microchips have been separated and removed, may be supplied to a coolant spray nozzle 13 installed at the spindle 12 of the machine tool 10 as well as to a coolant supply valve 30 installed at the rear end of the flushing duct 20 to be reused in the machine tool 10.

As described above, the chip processing device of the present invention may collect the microchips without leaving any residues in the coolant tank 50 when machining a workpiece which has high hardness such as glass or quartz and generates microchips during a cutting operation, completely separate the microchips contained in the collected coolant and discharge such microchips, and reuse only refined coolant without microchips in the machine tool 10, thereby preventing wear inside the machine tool 10 due to penetration of the microchips.

Meanwhile, although the present invention has been described above with respect to a workpiece with high hardness such as glass or quartz which generates microchips, it would be noted that the present invention may be applicable to a general machine tool which is configured to machine a workpiece generating microchips including metals or non-metals.

EXPLANATION OF SIGN

10: machine tool
11: table
12: spindle
13: coolant spray nozzle
20: flushing duct
21: inclined surface
22: bending portion
30: coolant supply valve
40: slope duct
50: coolant tank
51: primary filter
52: secondary filter
53: sliding plate
54: level sensor
55: primary return pump
60: centrifugal separator device
61: main separator body
62: dirty tank
63: secondary return pump
64: suction port
65: gradient
70: dean tank
71: coolant supply pump

INDUSTRIAL APPLICABILITY

By applying; the present invention to a chip processing device of a machine tool, it is possible to extend a wear life of the machine tool due to the microchips. Therefore, the present invention is a useful technology for manufacturing of the machine tool and for the industrial field using the same.

What is claimed is:

1. A chip processing device for a machine tool, comprising:
a respective flushing duct installed on each of two opposite sides of a table of the machine tool, each of the flushing ducts having a respective longitudinal axis that extends in a longitudinal direction of the table, wherein each of the flushing ducts has a respective one longitudinal end portion that is lower than the corresponding opposite longitudinal end portion thereof such that each of the flushing ducts is inclinedly disposed, and wherein each of the flushing ducts has a respective lower cross-section thereof that includes a respective pair of inclined surfaces that form a V-shape, and wherein for each of the flushing ducts, the corresponding pair of inclined surfaces are connected by a respective curved corner portion;
a slope duct inclinedly disposed at one longitudinal end portion of the table of the machine tool, the slope duct configured to allow a coolant that has been supplied to the slope duct from the flushing ducts to flow in a downward direction, wherein a lower cross-section of the slope duct includes a pair of inclined surfaces that form a V-shape, and wherein the inclined surfaces of the slope duct are connected by a curved corner portion;
a respective coolant supply valve installed at a respective upper end of each of the inclined flushing ducts to supply the coolant to the corresponding one of the flushing ducts;
a coolant tank provided below one end portion of the slope duct to collect the coolant fallen from both the flushing ducts and the slope duct; and
a centrifugal separator device installed at one side of the coolant tank to separate microchips included in the coolant;
wherein a primary filter is disposed at an inlet of the coolant tank for filtering larger-sized chips among the microchips contained in the coolant supplied from the flushing duct and the slope ducts;
wherein a sliding plate is inclinedly installed below the primary filter, which sliding plate is inclined in a manner so as to guide microchips contained in the coolant toward a center portion of the coolant tank;
wherein a primary return pump is provided at the center portion of the coolant tank, which primary return pump has a suction port that is disposed toward a bottom surface of the coolant tank in order to introduce and pump the coolant containing the microchips to a dirty tank of the centrifugal separator device; and
wherein a secondary filter is provided between the coolant tank and the dirty tank in order to filter the coolant, which has not yet been transported through the primary return pump, to be transported to the dirty tank.

2. The chip processing device of claim 1, wherein the coolant tank comprises a level sensor for detecting a level of the coolant in the coolant tank, and wherein the primary return pump is configured for transporting the coolant containing the microchips to the dirty tank of the centrifugal separator device when the coolant level detected by the level sensor is within a predetermined range, and wherein when the coolant level detected by the level sensor reaches a predetermined maximum level, the level sensor is configured to make an emergency stop of the machine tool.

3. The chip processing device of claim 1, wherein the dirty tank is configured for receiving the coolant containing microchips from the primary return pump, and is configured for storing the coolant containing the microchips that is received from the primary return pump,
wherein a secondary return pump is installed at an upper portion of the dirty tank to pump the coolant in the dirty tank,
wherein the centrifugal separator device further comprises a main separator body for centrifugally separating the coolant supplied through the secondary return pump into microchips and a refined coolant,
wherein the centrifugal separator device further comprises a coolant cooler for cooling the refined coolant, and
wherein a clean tank receives the coolant which has been cooled from the coolant cooler.

* * * * *